(12) United States Patent
Matsuo et al.

(10) Patent No.: US 8,989,043 B2
(45) Date of Patent: Mar. 24, 2015

(54) MOBILE TERMINAL, BASE STATION, CELL RECEPTION QUALITY MEASURING METHOD AND CELL RECEPTION QUALITY MEASURING SYSTEM

(75) Inventors: Hidenori Matsuo, Kanagawa (JP); Takahisa Aoyama, Kanagawa (JP); Takashi Tamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 157 days.

(21) Appl. No.: 13/814,319

(22) PCT Filed: Feb. 2, 2012

(86) PCT No.: PCT/JP2012/000709
§ 371 (c)(1),
(2), (4) Date: Feb. 5, 2013

(87) PCT Pub. No.: WO2012/132187
PCT Pub. Date: Oct. 4, 2012

(65) Prior Publication Data
US 2013/0136027 A1  May 30, 2013

(30) Foreign Application Priority Data
Mar. 31, 2011 (JP) .................. 2011-077305

(51) Int. Cl.
*H04W 24/00* (2009.01)
*H04W 24/10* (2009.01)
*H04W 36/00* (2009.01)
*H04W 84/04* (2009.01)

(52) U.S. Cl.
CPC .......... *H04W 24/10* (2013.01); *H04W 36/0088* (2013.01); *H04W 84/045* (2013.01)

USPC ......... 370/252; 370/332; 455/436; 455/452.2

(58) Field of Classification Search
None
See application file for complete search history.

(56) References Cited

U.S. PATENT DOCUMENTS

| 8,805,398 | B2* | 8/2014 | Morita et al. .............. 455/452.2 |
| 2007/0191013 | A1* | 8/2007 | Gunnarsson et al. ......... 455/438 |
| 2010/0069063 | A1* | 3/2010 | Osterling et al. ............ 455/434 |
| 2011/0292824 | A1* | 12/2011 | Uemura et al. ............... 370/252 |

OTHER PUBLICATIONS

Panasonic, "DU/UL frame timing synchronization scheme for Heterogeneous Networks", 3GPP TSG RAN WG1#63, R1-106091, Nov. 15, 2010, pp. 1-4.

(Continued)

*Primary Examiner* — Chi H Pham
*Assistant Examiner* — Shick Hom
(74) *Attorney, Agent, or Firm* — Pearne & Gordon LLP

(57) ABSTRACT

Disclosed is a technique for providing a mobile terminal and the like capable of reducing inter-cell interference between a macro cell and a small cell, suppressing frequent switching of a primary cell in carrier aggregation, and hence reducing an increase in the processing load on a base station and an increase in the power consumption of the terminal. According to the technique, there are included a receiving unit 603 for receiving a message including information for causing a reception quality in a second cell to be measured in tune with timing of a predetermined control channel area of a signal to be transmitted from a first base station in a predetermined frequency band, and a measurement unit 605 for measuring the reception quality in the second cell based on the information received.

20 Claims, 11 Drawing Sheets

(56) References Cited

OTHER PUBLICATIONS

LG Electronics Inc., "RLF report indicating use of ABS", 3GPP TSG-RAN WG2 #73, R2-111253, Feb. 21, 2011, pp. 1-3.

3GPP TSG WG1 Meeting #60, San Francisco, USA, Feb. 22-26, 2010, PDCCH Interference Management for Heterogeneous Network Research in Motion, UK Limited, R1-101106.
International Search Report for PCT/JP2012/000709 dated Mar. 27, 2012.

* cited by examiner

MOBILE TERMINAL, BASE STATION, CELL RECEPTION QUALITY MEASURING METHOD AND CELL RECEPTION QUALITY MEASURING SYSTEM

TECHNICAL FIELD

The present invention relates to a mobile terminal, a base station, a cell reception quality measuring method, and a cell reception quality measuring system for reducing interference in such a network that deploys a small cell within a macro cell.

BACKGROUND ART

In 3GPP, LTE-advanced as a developed version of LTE has been considered, giving consideration of a wireless interface efficiently covering a local area such as an indoor facility where a large volume of traffic is concentrated in addition to a cell layout centered on a conventional macro cell. Along with this, a heterogeneous network (HetNet) for deploying a low transmission power cell (small cell), such as a pico cell or a femto cell, within a macro cell has been considered. It is desired that the frequencies of the macro cell and the low transmission power cell be the same in terms of the frequency usage efficiency in the HetNet environment. However, in this case, there arises a problem of inter-cell interference between the macro cell and the small cell.

When the small cell is a pico cell, a method is under consideration in which a technique called Cell Range Expansion (CRE) is applied for the purpose of load distribution from a macro base station to cause a macro terminal (MUE) outside of the coverage of the pico cell to attach to the pico cell. As shown in FIG. 11, a terminal (PUE) to attach to a pico cell outside the coverage of the pico cell by the application of CRE experiences large interference from the macro cell. Particularly, interference from a control channel of the macro cell to a control channel to the PUE has become a problem (see FIG. 12), and various interference control methods have been considered. As one of the methods, there is a method of providing a blank area (Almost blank subframe: ABS) in a specific subframe to be transmitted from the macro cell to reduce interference with the pico cell (see FIG. 13).

Further, in a system using carrier aggregation (CA) for aggregating LTE compatible frequency bands (component carriers) to realize a wider bandwidth, the application of cross carrier scheduling is considered to reduce interference between a macro cell and a small cell (see Non-Patent Document 1). The cross carrier scheduling is a technique in which, when secondary cells (SCell) of frequency bands different from a primary cell (PCell) of a certain frequency band are aggregated to perform communication, SCell control information is notified from a control channel of the PCell to eliminate the need for the control channels of the SCells. A subframe pattern to which this cross carrier scheduling is applied is set individually for each UE.

The application of this cross carrier scheduling can mitigate interference from a macro cell to the control channel of a pico cell at a SCell frequency (secondary frequency) of the macro cell the control channel of which is unnecessary. On the other hand, at a secondary frequency of a pico cell the control channel of which is unnecessary, there is no need to care about interference from the control channel of the macro cell. Thus, it is desired in the system using the carrier aggregation to deploy a PCell of macro cell and a PCell of pico cell in such a manner to make the frequencies thereof different from each other as shown in FIG. 14 in order to reduce interference between the macro cell and the small cell. In other words, a SCell of pico cell is deployed for a PCell of macro cell, and a PCell of pico cell is deployed for a SCell of macro cell.

PRIOR ART DOCUMENT

Non-Patent Document

Non-Patent Document 1:
http://www.3gpp.org/ftp/tsg_ran/wg1_rl1/TSGR1__60/Docs/R1-101106.zip Interference that cannot be mitigated even by cross carrier scheduling is reduced by using ABS described above in the specific subframe of the macro cell. However, since the pico cell transmits a control channel at f1 to a UE (non-CA PUE) attaching to the pico cell on f1 in FIG. 14 without application of carrier aggregation (CA), interference with a control channel of the macro cell that transmits the control channel in all subframes occurs (see FIG. 15).

With the introduction of above-mentioned ABS for the purpose of interference control, a technique for measurement restriction of reception quality measurement timing to restrict the timing of measuring the reception quality subframe by subframe because of a difference in reception quality between ABS and a normal subframe has been considered. For example, when a macro terminal (MUE) located in a coverage area of a pico cell that is expanded by CRE (hereinafter called a CRE area) measures the pico cell as an adjacent cell, the reception quality is measured at ABS timing at which there is no interference from the macro cell. This makes the reception quality of the pico cell better than the macro cell and hence easier to perform handover to the pico cell, enabling load distribution from the macro cell to the pico cell.

On the other hand, upon measuring the pico cell as an own cell, a pico terminal (PUE) can make a measurement at ABS timing in the same manner to maintain the attachment to the pico cell. Note that the reception quality is measured by using a reference signal (Cell reference signal: CRS) or the like sparsely arranged within subframes among signals transmitted from the base station. The UE is required to be aware of a measured subframe pattern to restrict the reception quality measurement timing. Pattern information is notified from the base station to each individual UE.

SUMMARY OF THE INVENTION

The present invention has been made in view of the above problems, and it is an object thereof to provide a mobile terminal, a base station, a cell reception quality measuring method, and a cell reception quality measuring system, capable of reducing inter-cell interference between a macro cell and a small cell, suppressing frequent PCell switching, and hence reducing an increase in the processing load on the base station and an increase in the power consumption of the terminal.

In order to attain the above object, according to the present invention, there is provided a mobile terminal in a communication system, where a first cell the range of which is accessible by the mobile terminal is formed by a first base station, a second cell the range of which is accessible by the mobile terminal is formed within the first cell by a second base station, and each of the base stations communicates with the mobile terminal using multiple frequency bands, the mobile terminal including: a receiving unit for receiving a message including information for measuring a reception quality in the second cell in tune with timing of a predetermined control channel area of a signal transmitted from the first base station in a predetermined frequency band; and a measurement unit for measuring the reception quality in the second cell based on the information received. This can reduce inter-cell interference between a macro cell and a small cell. The information for measuring the reception quality in the second cell is a measurement-restricted cell list or pattern information to be described later.

According to the present invention, there is also provided a base station to which a mobile terminal belongs in a communication system, where a first cell the range of which is accessible by the mobile terminal is formed by a first base station, a second cell the range of which is accessible by the mobile terminal is formed within the first cell by a second base station, and each of the base stations communicates with the mobile terminal using multiple frequency bands, the base station including: a receiving unit for receiving cell information on a cell from a base station adjacent to the base station; a message generation unit for generating, based on the cell information received, a message including information for causing a reception quality in the second cell to be measured in tune with timing of a predetermined control channel area of a signal to be transmitted in a predetermined frequency band; and a transmitting unit for transmitting the generated message to the mobile terminal. This can reduce inter-cell interference between a macro cell and a small cell.

According to the present invention, there is further provided a cell reception quality measuring method for a mobile terminal in a communication system, where a first cell the range of which is accessible by the mobile terminal is formed by a first base station, a second cell the range of which is accessible by the mobile terminal is formed within the first cell by a second base station, and each of the base stations communicates with the mobile terminal using multiple frequency bands, the method including: a step of causing a base station, to which the mobile terminal belongs, to generate a message including information for causing a reception quality in the second cell to be measured in tune with timing of a predetermined control channel area of a signal to be transmitted in a predetermined frequency band, and transmit the message to the mobile terminal; and a step of causing the mobile terminal to receive the message including the information transmitted, and measure the reception quality in the second cell based on the information received. This can reduce inter-cell interference between a macro cell and a small cell.

Further, according to the present invention, there is provided a cell reception quality measuring system in which a mobile terminal is configured to measure a reception quality of a cell, where a first cell the range of which is accessible by the mobile terminal is formed by a first base station, a second cell the range of which is accessible by the mobile terminal is formed within the first cell by a second base station, and the mobile terminal communicates with each of the base stations using multiple frequency bands, the system configured to: cause a base station, to which the mobile terminal belongs, to generate a message including information for causing a reception quality in the second cell to be measured in tune with timing of a predetermined control channel area of a signal to be transmitted in a predetermined frequency band, and transmit the message to the mobile terminal; and cause the mobile terminal to receive the message including the information transmitted, and measure the reception quality in the second cell based on the information received. This can reduce inter-cell interference between a macro cell and a small cell.

Since the mobile terminal, the base station, the cell reception quality measuring method, and the cell reception quality measuring system of the present invention can reduce inter-cell interference between a macro cell and a small cell, frequent PCell switching can be suppressed, and hence an increase in the processing load on the base station and an increase in the power consumption of the terminal can be suppressed.

DESCRIPTION OF EMBODIMENTS

<First Embodiment>

Figure 1:
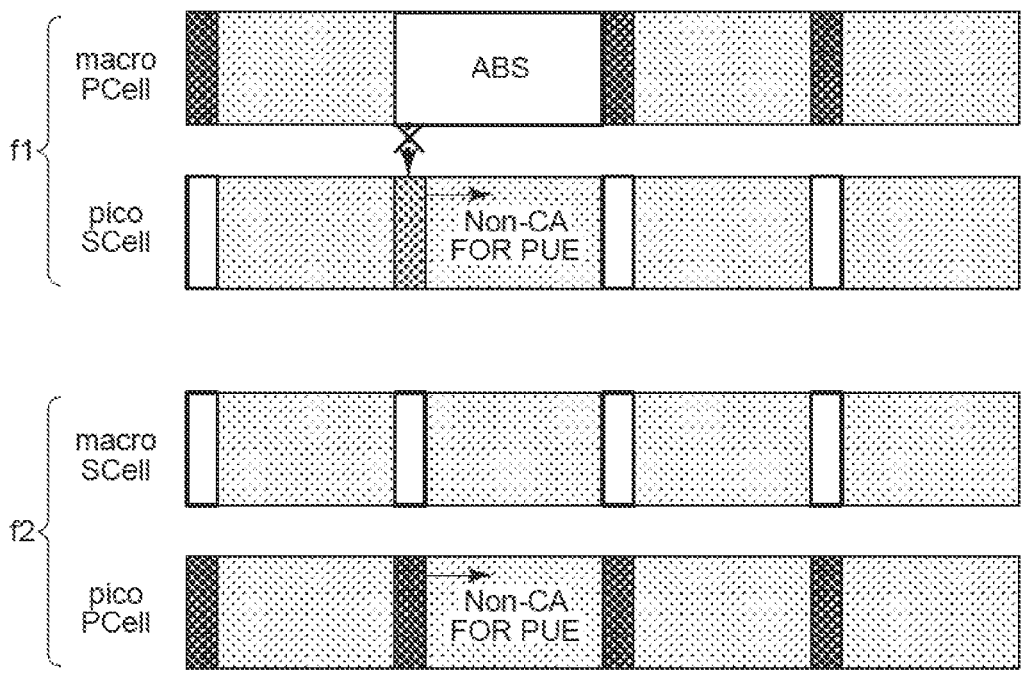
FIG. 1 is a diagram for describing that interference can be mitigated by providing ABS in a first embodiment of the present invention.
Figure 14:
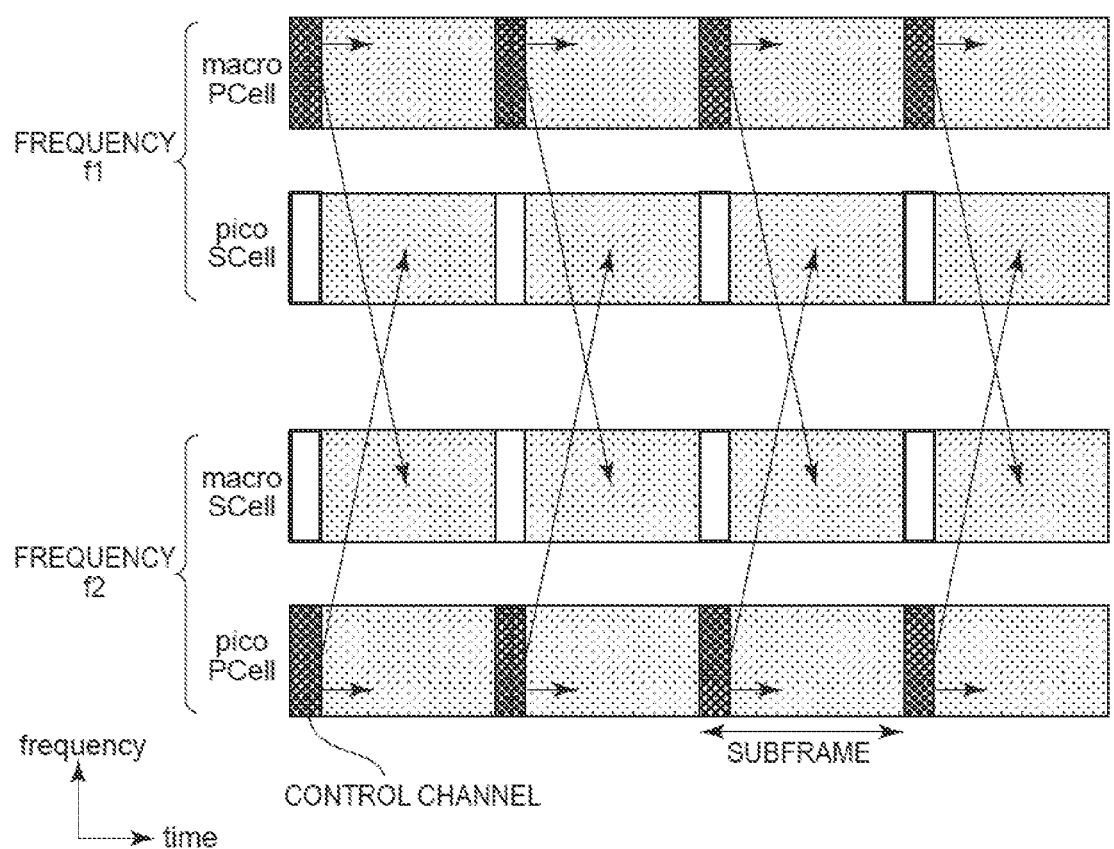
FIG. 14 is a diagram for describing reduction in interference when conventional cross carrier scheduling is used.
Figure 15:
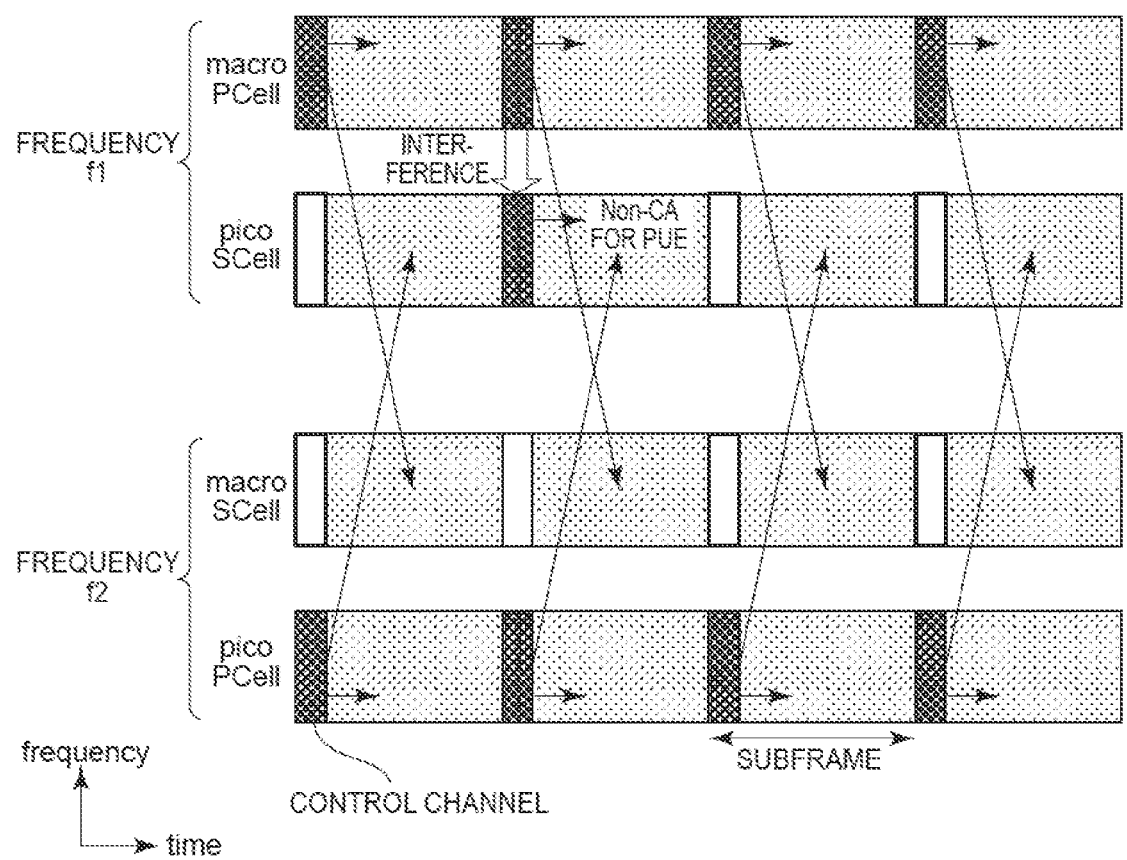
FIG. 15 is a diagram for describing interference with a control channel to a pico terminal that does not perform conventional carrier aggregation.

Since a pico cell transmits a control channel at f1 to a UE (non-CA PUE) attaching to the pico cell on f1 in FIG. 14 mentioned above without application of carrier aggregation (CA), interference with a control channel of a macro cell transmitting the control channel in all subframes occurs (see FIG. 15). To solve this problem, it is contemplated that ABS is set only in a PCell of macro cell (see FIG. 1).

Figure 2:
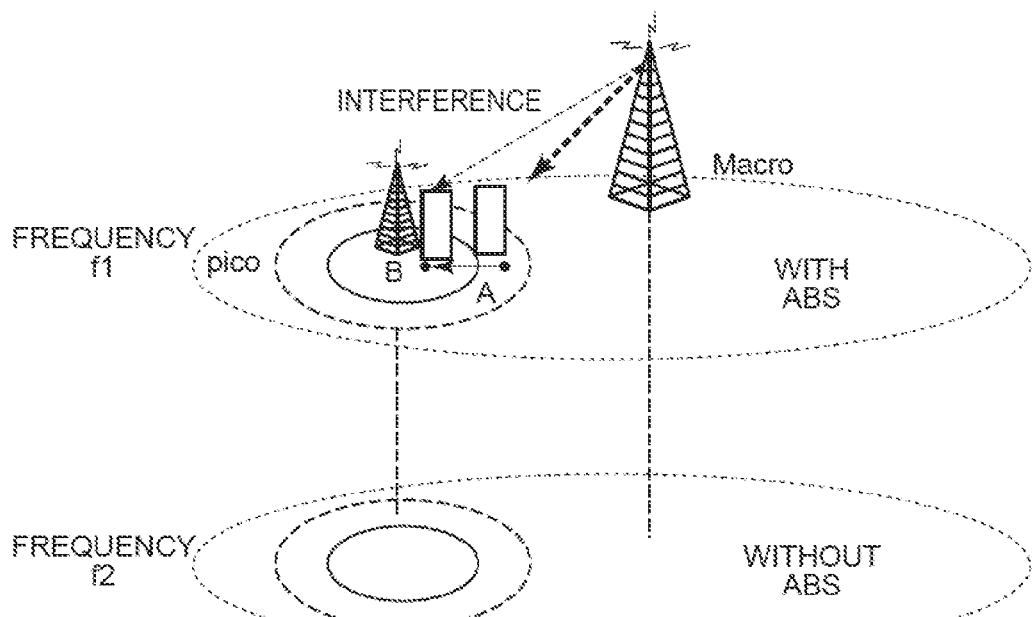
FIG. 2 is a diagram showing an example of cell layout in a carrier aggregation applying system in the first embodiment of the present invention.

Here, even in a UE that applies carrier aggregation, when the macro cell applies ABS, the reception quality measurement timing is restricted in the same manner. For example, when an MUE that applies carrier aggregation in a CRE area (point A in FIG. 2) measures a pico cell as an adjacent cell, the MUE makes a measurement at ABS timing on a primary frequency (f1) of the macro cell. Further, when the pico cell is measured on a secondary frequency (f2) of the macro cell, since there is no ABS, the reception quality measurement timing is not restricted. Thus, the reception quality of the pico cell on f1 with mitigated interference from the macro cell is better that the reception quality of the pico cell on f2. Among cells in multiple frequency bands, for example, the UE that applies carrier aggregation sets a cell high in reception quality as a PCell and the other cells as SCells. Therefore, after the MUE performs the handover to a pico cell because of CRE, the pico cell on f1 becomes the pico PCell.

Further, upon measuring an own pico cell, the PUE that applies carrier aggregation at point A makes a measurement at ABS timing on f1. On f2, the reception quality measurement timing is not restricted. Therefore, like the case of the MUE in the CRE area, the pico cell on f1 becomes the pico PCell. Further, upon measuring an own cell like the PUE in the CRE area, a PUE that applies carrier aggregation in the neighborhood of a pico base station (point B in FIG. 2) makes a measurement at ABS timing on f1, and does not restrict the reception quality measurement timing on f2. In this case, since point B experiences less interference from the macro cell, it does not matter whether the reception quality measurement timing is restricted or not. Therefore, the network may set f2 for PCell of the pico cell.

When the PUE that applies carrier aggregation moves from the CRE area (point A) into the neighborhood (point B) of the pico base station, the connection to the same pico base station requires PCell switching along the way, which corresponds to handover processing, as a result of the reception quality mentioned above. This PCell switching results in an increase in the processing load on the base station and an increase in the power consumption of the terminal. Further, since the PUE that applies carrier aggregation at point A sets f1 for PCell of the pico cell, the frequency of PCell of the pico cell (primary frequency) becomes the same as the primary frequency of the macro cell, and hence interference control by the cross carrier scheduling as shown in FIG. 14 becomes non-functional.

In contrast, the point of the embodiment to be described below is to measure the reception quality of the pico cell by using a blank area (ABS) that is not transmitted from the macro cell even on the secondary frequency (f2) without any blank area of the macro cell in order to make the reception quality of the secondary frequency f2 better than the reception quality of the frequency f1 of the pico cell that is the same frequency as the primary frequency (f1) of the macro cell. This can suppress frequent PCell switching, and hence reduce the increase in the processing load on the base station and the increase in the power consumption of the terminal.

Figure 3:
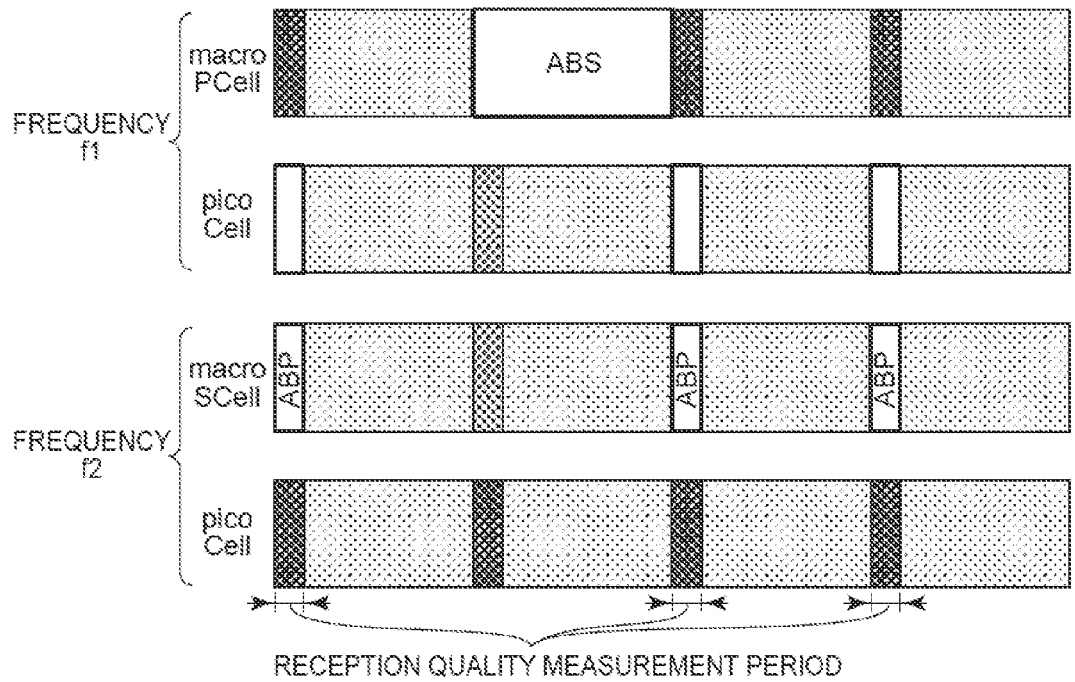
FIG. 3 is a diagram for describing the restriction of a reception quality measurement in the carrier aggregation applying system in the first embodiment of the present invention.

Specifically, a serving base station first creates cell lists (see FIG. 4 to be described later) for restricting the reception quality measurement timing based on information acquired from adjacent cells. At this time, a cell list for a measurement at conventional ABS timing and a cell list for a measurement at the timing of a blank area (hereinafter called almost blank PDCCH (ABP)) in a control channel portion generated by a SCell of macro cell generated by the cross carrier scheduling as shown in FIG. 3 are created for each frequency. In other words, the predetermined control channel area is a control channel area in a subframe on which a first base station (macro base station) performs cross carrier scheduling. This cell list is notified from the serving base station (cell) using a measurement setting message (RRC connection reconfiguration). In other words, information for making a measurement is transmitted from a base station to which the mobile terminal (UE) belongs.

The terminal checks cells detected by the terminal against both of the cell lists received, and a matched cell makes measurements in the ABS area and the ABP area in tune with the reception quality measurement timings of ABS and ABP, respectively. As for the cells that do not match the lists, normal reception quality measurements are made to make an event determination (to determine whether the reception quality exceeds). When an event is triggered, a reception quality measurement message (measurement report) is transmitted to the serving base station. The pattern of restricting the reception quality measurement timing is generated from a pattern of subframes of the macro cell on which cross carrier scheduling is performed. When the macro cell applies an MBSFN subframe, where only a part of control channel areas is used, the reception quality measurement timing may be restricted to the timing of the MBSFN subframe in the same manner as in ABP to make a measurement. In other words, the predetermined control channel area is a control channel area in an MBSFN subframe from the first base station (macro base station).

A MUE applying carrier aggregation understands a measured pattern from cross carrier scheduling information on the macro cell as its own cell. Therefore, upon measurement of the reception quality of an adjacent pico cell, there is no need to notify each individual UE of the pattern for restricting the measurement timing like in the case of restricting the reception quality measurement timing by ABS. Further, the subframe timings of cross carrier scheduling in the macro cell and the pico cell are made common to each other. In this case, since a PUE applying carrier aggregation can know the restricted reception quality measurement timing from the subframe timing of cross carrier scheduling of the pico cell as an own cell, there is no need to notify the UE thereof. In other words, it is so configured that the patterns of cross carrier scheduling in adjacent first base station (macro base station) and second base station (pico base station) are made common to each other. When a UE does not perform cross carrier scheduling, or when a subframe for restricting the reception quality measurement timing is different from the pattern of cross carrier scheduling, the measurement pattern is notified to each individual UE.

Further, the following settings can further mitigate interference from a macro cell during a period of measuring the reception quality when the reception quality measurement timing of a pico cell is restricted:

(1) The subframe pattern of cross carrier scheduling set for each individual UE in the conventional is made common to the subframe timing of cross carrier scheduling for a MUE that attaches to the same macro cell and applies carrier aggregation. In other words, it is so configured that the patterns of cross carrier scheduling for mobile terminals connecting to a first base station (macro base station) are made common to each other.

(2) Any MUE without application of carrier aggregation is not allocated at the subframe timing of cross carrier scheduling applied by the macro cell to an MUE that applies carrier aggregation. In other words, it is so configured that any mobile terminal belonging to the first base station to which carrier aggregation to enable a wider bandwidth is not applied is not scheduled in a subframe on which cross carrier scheduling is performed.

Figure 4:
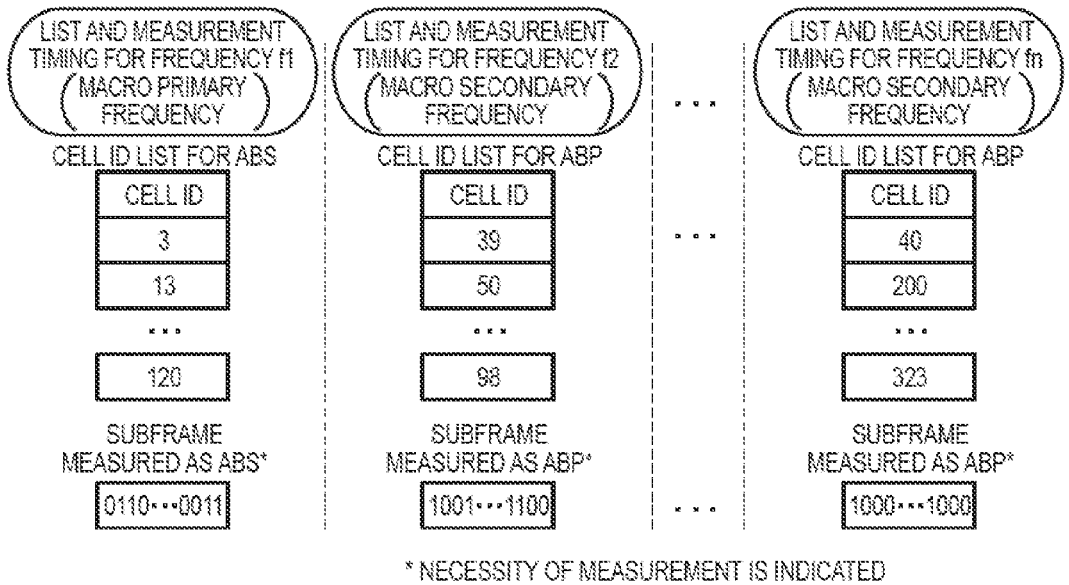
FIG. 4 is a diagram showing an example of measurement-restricted cell lists and measurement timings notified from a serving base station in the first embodiment of the present invention.

According to the embodiment, since interference from the macro cell is mitigated in the CRE area to enable the UE to measure the reception quality of the pico cell, the reception quality can be compared fairly with the reception quality measured at ABS timing of PCell of the macro cell, so that the frequency (f2) of the pico cell that is the same frequency as the secondary frequency (f2) of the macro cell like the PUE located in the neighborhood of the pico base station can be set as PCell of the pico cell. This can prevent the PUE that applies carrier aggregation like in the conventional from changing PCell near the boundary between the CRE area and the coverage of the pico cell. Further, as shown in FIG. 14, since PCell of the macro cell and PCell of the pico cell can be so deployed that both frequencies are different, interference control by cross carrier scheduling functions properly. FIG. 4 shows an example of measurement-restricted cell lists and measurement timings notified from the serving base station. In the example shown in FIG. 4, the measured cell lists include a cell ID list for ABS and cell ID lists for ABP. Included in the cell ID list for ABS are cell IDs of cells, each of which restricts the measurement of the reception quality to a specific subframe based on the ABS pattern on frequency f1 (macro primary frequency). Included in the cell ID lists for ABP are cell IDs of cells, which restrict the measurements of the reception qualities to the timings of control channels in specific subframes based on the ABP patterns on frequencies f2 to fn (macro secondary frequencies). Further, the example shown in FIG. 4 is that measurement timings are indicated as a bit sequence expressing, as a bit value (0 or 1) for each subframe, the necessity of a measurement by restricting subframes for measuring reception qualities to specific subframes or control channels as ABS and ABP.

Figure 5A:
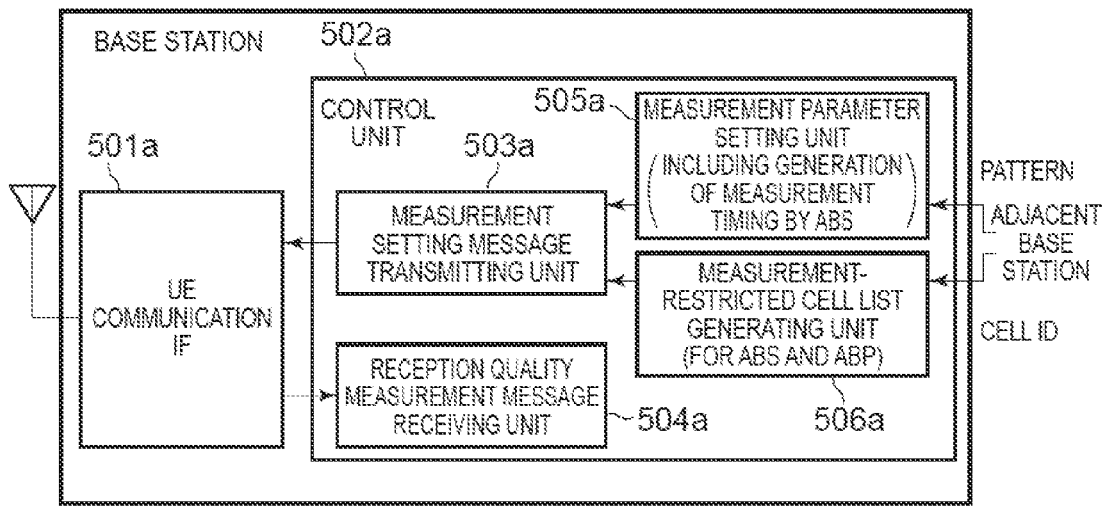
FIG. 5A is a block diagram showing an example of the structure of a base station (serving base station) according to the first embodiment of the present invention.
Figure 5B:
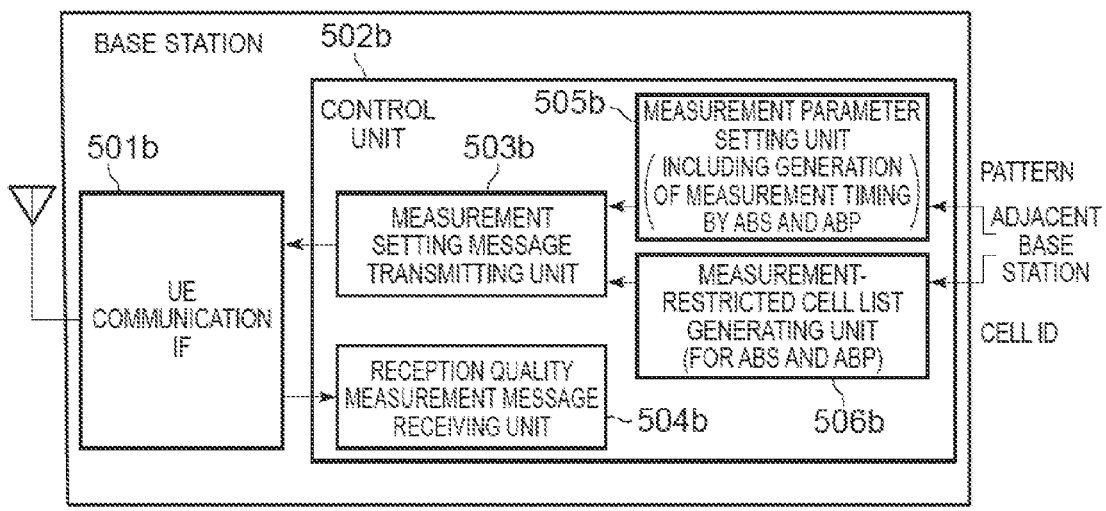
FIG. 5B is a block diagram showing another example of the structure of the base station (serving base station) according to the first embodiment of the present invention.
Figure 6:
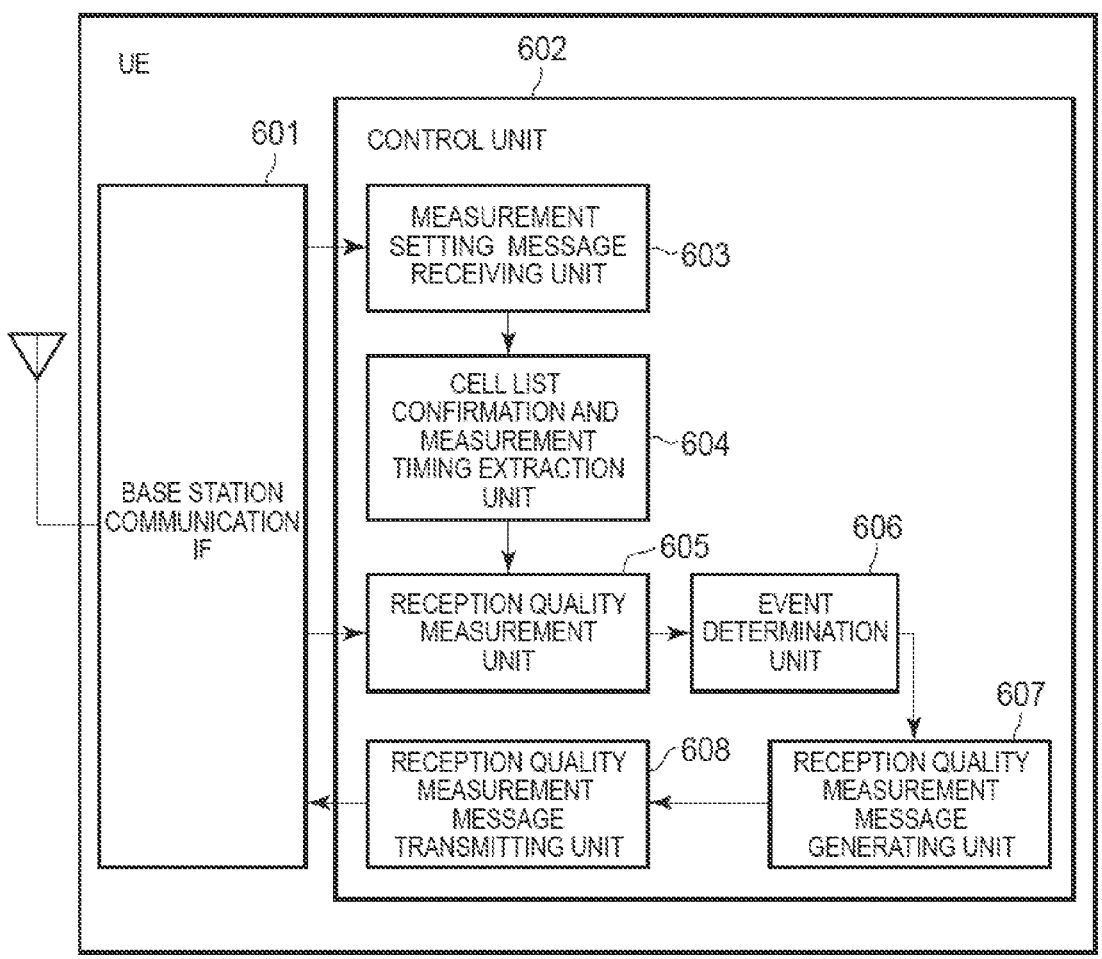
FIG. 6 is a block diagram showing an example of the structure of a UE according to the first embodiment of the present invention.

Next, examples of the structures of base stations according to the embodiment are shown in FIG. 5A and FIG. 5B, and an example of the structure of a UE is shown in FIG. 6. FIG. 5A is a block diagram when a base station does not give notice of ABP patterns. FIG. 5B is a block diagram when the base station gives notice of ABP patterns. As shown in FIG. 5A, the base station is composed of a UE communication IF 501a and a control unit 502a. Further, the control unit 502a is composed of a measurement setting message transmitting unit 503a, a reception quality measurement message receiving unit 504a, a measurement parameter setting unit 505a, and a measurement-restricted cell list creating unit 506a.

The UE communication IF 501a is an interface used for communicating with a UE. The measurement setting message transmitting unit 503a transmits reception quality measurement timing, generated based on a subframe pattern to which ABS generated by the measurement parameter setting unit 505a is applied, to the UE through the UE communication IF 501a, and transmits a cell list, indicative of cells the reception qualities of which are restricted at ABS timing generated by the measurement-restricted cell list generating unit 506a, and cell lists, indicative of cells the reception qualities of which are restricted at ABP timings, to the UE through the UE communication IF 501a. The reception quality measurement message receiving unit 504a receives a message including information on reception qualities measured by the UE. The measurement parameter setting unit 505a generates the ABS pattern as mentioned above. The measurement-restricted cell list generating unit 506a generates the cell lists for restricting reception quality measurements at the timings of ABS and ABP as mentioned above.

In a base station shown in FIG. 5B, only a measurement parameter setting unit 505b is different from the measurement parameter setting unit 505a in the base station shown in FIG. 5A, and the other components are basically the same. The measurement parameter setting unit 505b also generates reception quality measurement timings to be generated based on subframe patterns, to which ABP is applied, in addition to the subframe pattern to which ABS is applied.

FIG. 6 shows an example of the structure of a UE. The UE is composed of a base station communication IF 601 and a control unit 602. Further, the control unit 602 is composed of a measurement setting message receiving unit 603, a cell list confirmation and measurement timing extraction unit 604, a reception quality measurement unit 605, an event determination unit 606, a reception quality measurement message generating unit 607, and a reception quality measurement message transmitting unit 608.

The base station communication IF 601 is an interface used for communicating with a base station or the like. The measurement setting message receiving unit 603 receives a measurement setting message transmitted from a base station. Based on the measurement setting message received, the cell list confirmation and measurement timing extraction unit 604 checks detected cells against both of the cell lists and acquires reception quality measurement timing based on subframe patterns to which ABS and ABP are applied. The reception quality measurement unit 605 measures the reception quality of a cell, which matches the cell lists, in an ABS area and an ABP area in tune with the reception quality measurement timings of ABS and ABP, respectively. As for the cells that do not match the lists, normal reception quality measurements are performed. The event determination unit 606 determines whether the reception quality exceeds a predetermined one. When an event is triggered, the reception quality measurement message generating unit 607 generates a reception quality measurement message. The reception quality measurement message transmitting unit 608 transmits the generated reception quality measurement message (measurement report) to the base station through the base station communication IF 601.

Figure 7:
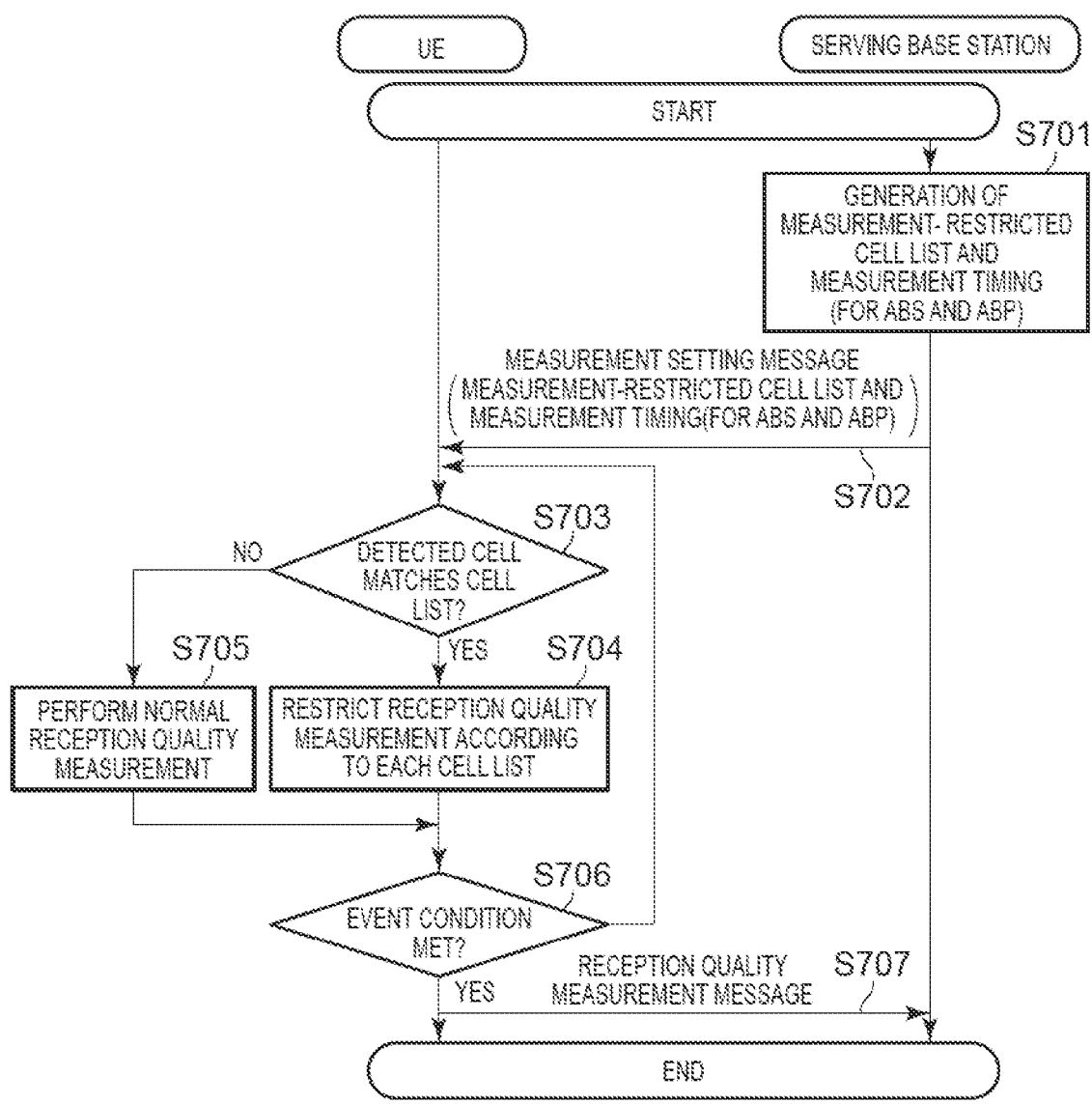
FIG. 7 is a flowchart showing an example of a processing flow in the first embodiment of the present invention.

Next, an example of a processing flow in the embodiment is shown in FIG. 7. As shown in FIG. 7, the base station generates a measurement-restricted cell list and a measurement timing pattern indicative of the reception quality measurement timings based on the ABP and ABS patterns (step S701). Note that this processing flow is a flow of giving notice of the measurement timing pattern. On the other hand, in the case of a flow in which the measurement timing pattern is not notified, only the reception quality measurement timing based on the ABS pattern is generated in step S701. The base station transmits, to the UE, a measurement setting message including the measurement-restricted cell list (step S702). When receiving the measurement setting message, the UE determines whether a cell detected by itself matches a cell list (step S703). When the detected cell matches, the reception quality measurement is restricted at ABS or ABP timing according to either of the cell lists, with which the detected cell matches (the cell list to be measured at ABS timing or the cell list to be measured at ABP timing) (step S704). On the other hand, when the detected cell does not match, the normal reception quality measurement is performed (step S705). After step S704 or S705, the UE determines whether an event condition is met (whether the reception quality exceeds a predetermined one) (step S706). When the event condition is met, the UE generates and transmits a reception quality measurement message to the base station (step S707).

Figure 8:
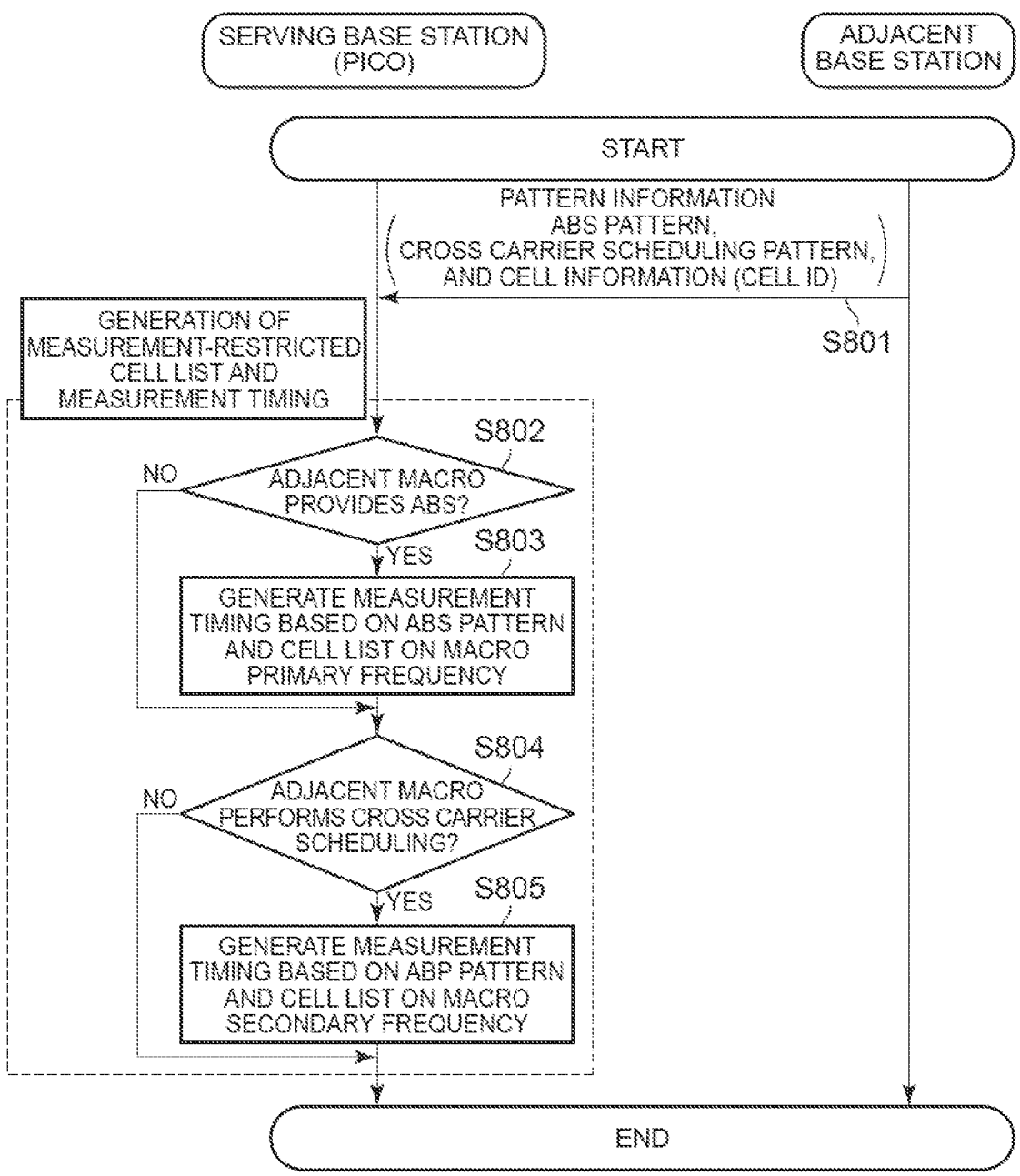
FIG. 8 is a flowchart showing an example of a processing flow when the serving base station in the first embodiment of the present invention is a pico base station.
Figure 9:
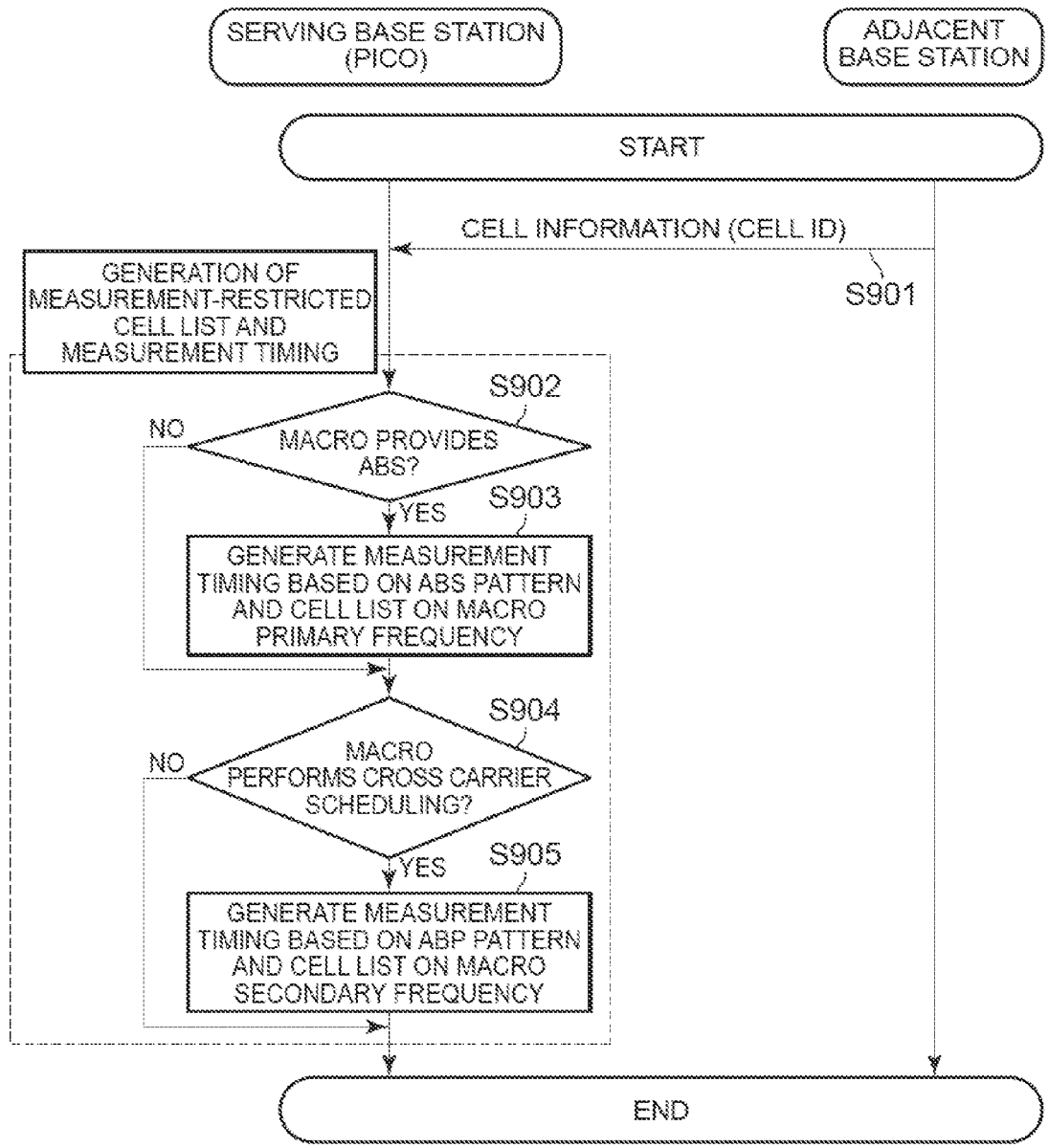
FIG. 9 is a flowchart showing an example of a processing flow when the serving base station in the first embodiment of the present invention is a macro base station.

Next, an example of a flow of generating a measurement-restricted cell list and a measurement timing pattern at a base station according to the embodiment is shown in FIG. 8 and FIG. 9. FIG. 8 shows a flow when the serving base station is a pico base station, and FIG. 9 shows a flow when the serving base station is a macro base station. As shown in FIG. 8, an adjacent base station transmits, to the serving base station, pattern information including an ABS pattern and a cross carrier scheduling pattern and cell information including an adjacent cell ID (step S801), on the information received, the serving base station determines whether the adjacent macro provides ABS (step S802), and when it provides ABS, measurement timing based on the ABS pattern and a cell list (a cell list of the pica base station) for measuring the reception quality at ABS timing are generated on an adjacent macro primary frequency (step S803). Then, it is determined whether the adjacent macro performs cross carrier scheduling (step S804), and when it performs cross carrier scheduling, measurement timing based on the ABP pattern and a cell list (a cell list of the pica base station) for measuring the reception quality at ABP timing are generated on an adjacent macro secondary frequency (step S805).

Further, as shown in FIG. 9, when the serving base station is a macro base station, the adjacent base station transmits, to the serving base station, cell information including cell IDs of cells to which ABS is applied and cell IDs of cells to which ABP is applied (step S901). Based on the information received, the serving base station determines whether the macro (serving base station) provides ABS (step S902), and when it provides ABS, measurement timing based on the ABS pattern and a cell list (a cell list of the adjacent pica base station) for measuring the reception quality at ABS timing is generated on a macro primary frequency (step S903). Then, it is determined whether the macro performs cross carrier scheduling (step S904), and when it performs cross carrier scheduling, measurement timing based on ABP pattern and a cell list (a cell list of the adjacent pico base station) for measuring the reception quality at ABP timing are generated on a macro secondary frequency (step S905).

<Second Embodiment>

The point of this embodiment is that interference from a macro cell to a pica cell in an ABP area of the macro cell is more reduced than that in the first embodiment. Specifically, when there is a MUE that applies carrier aggregation without cross carrier scheduling or a MUE that does not apply carrier aggregation to the frequency on which ABP of the macro cell exists, a subframe with ABP of the macro cell is not allocated to such a MUE. In other words, it is so configured that, to a mobile terminal that does not apply cross carrier scheduling and/or carrier aggregation and belongs to a first base station, a subframe on which a mobile terminal other than the mobile terminal is performing cross carrier scheduling is not allocated, i.e., control information is transmitted on a control channel of a subframe other than the subframe with ABP.

Figure 10:
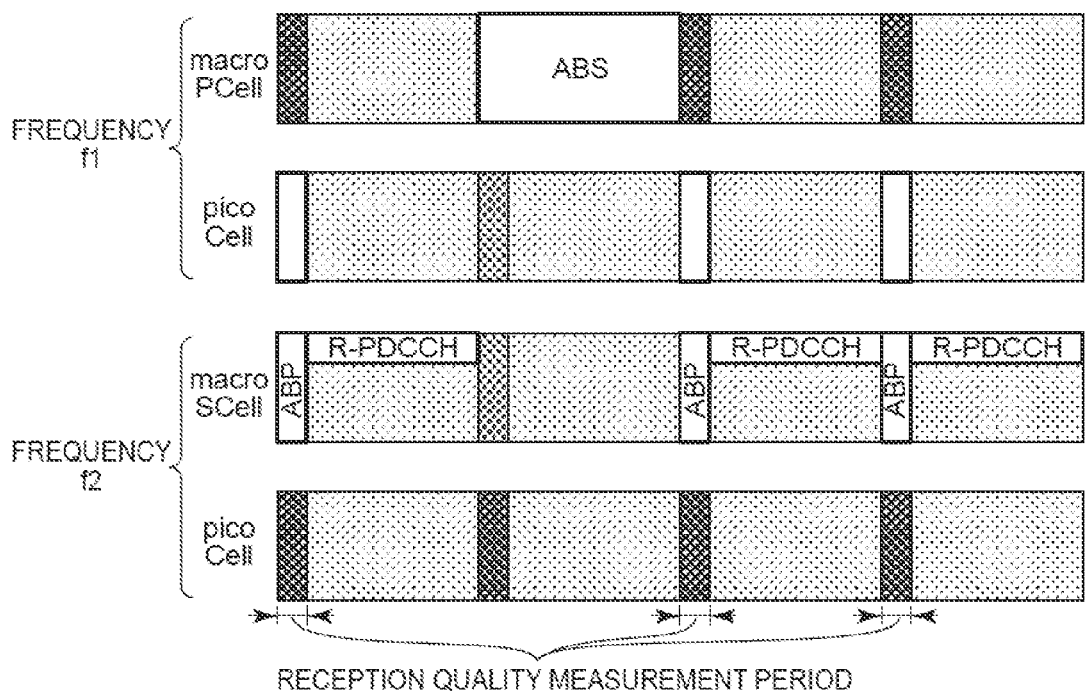
FIG. 10 is a diagram for describing the transmission of a control channel using a control channel (R-PDCCH) in a second embodiment of the present invention.
Figure 11:
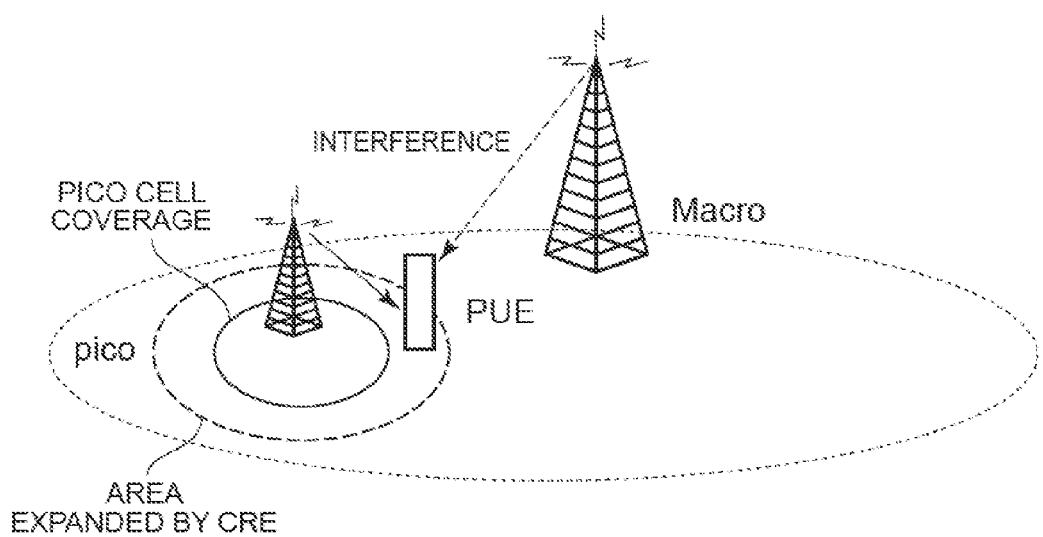
FIG. 11 is a diagram for describing interference by conventional Cell Range expansion.
Figure 12:
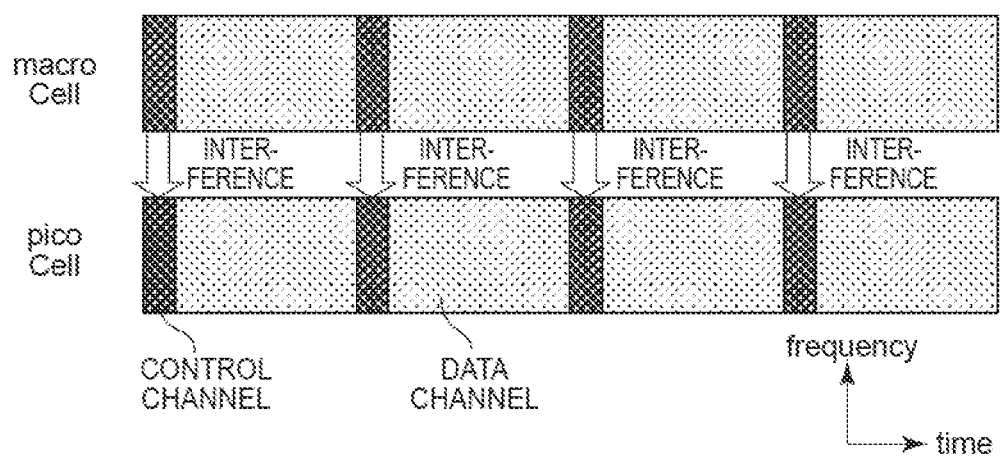
FIG. 12 is a diagram for describing interference of conventional control channels.
Figure 13:
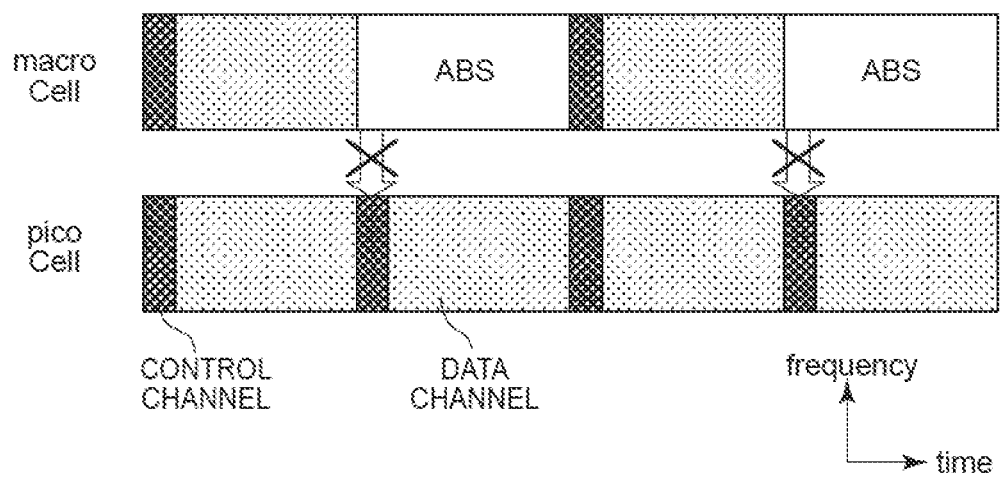
FIG. 13 is a diagram for describing reduction in interference by conventional ABS.

In order to transmit the control information to the MUE, the control information may be transmitted by using a control channel (R-PDCCH) allocated to a data area as shown in FIG. 10, rather than that the control information is allocated to the ABP area. In other words, control information on a first cell is transmitted by including it in a data area of a subframe including a predetermined control channel area. Further, even when the control information is transmitted by including it in an ABP area, the resource amount (aggregation size) of control information per UE may be increased to reduce the transmission power of a control channel of the macro cell per unit resource in order to reduce interference with a pico cell. In other words, it is so configured that, when the control information on the first cell is transmitted by including it in the predetermined control channel area, the resource amount of control information is increased. According to the embodiment, the control channel to the MUE is not allocated to the ABP area of the macro cell, or even when the control channel is allocated, transmission is not provided with power that causes interference with the pico cell. Thus, interference given from the macro cell to the control channel of the pico cell can be more reduced.

Each functional block used in the explanation of each of the aforementioned embodiments can be realized as an LSI (Large Scale Integration) that is typically an integrated circuit. Each functional block can be individually formed into a single chip, or some or all of the functional blocks can be included and formed into a single chip. Although referred to here as the LSI, the integrated circuit may be referred to as an IC (Integrated Circuit), a system LSI, a super LSI, or an ultra LSI depending on differences in integration. The method of forming the integrated circuit is not limited to LSI and can be actualized by a dedicated circuit or a general-purpose processor. An FPGA (Field Programmable Gate Array) that can be programmed after LSI manufacturing or a reconfigurable processor of which connections and settings of the circuit cells within the LSI can be reconfigured may be used. Further, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

Industrial Applicability

Since the mobile terminal, the base station, the cell reception quality measuring method, and the cell reception quality measuring system of the present invention can reduce inter-cell interference between a macro cell and a small cell, suppress frequent PCell switching, and hence reduce an increase in the processing load on the base station and an increase in the power consumption of the terminal, the present invention is useful for a mobile terminal, a base station, a cell reception quality measuring method, and a cell reception quality measuring system for reducing interference in such a network that deploys a small cell within a macro cell.

The invention claimed is:

1. A mobile terminal in a communication system, where a first cell the range of which is accessible by the mobile terminal is formed by a first base station, a second cell the range of which is accessible by the mobile terminal is formed within the first cell by a second base station, and each of the first base station and the second base station communicates with the mobile terminal using a plurality of frequency bands, the mobile terminal comprising:
   a receiving unit for receiving a message including information for measuring a reception quality in the second cell in tune with timing of a predetermined control channel area of a signal transmitted from the first base station in a predetermined frequency band; and
   a measurement unit for measuring the reception quality in the second cell based on the information received.

2. A mobile terminal in a communication system, where a first cell the range of which is accessible by the mobile terminal is formed by a first base station, a second cell the range of which is accessible by the mobile terminal is formed within the first cell by a second base station, and each of the first base station and the second base station communicates with the mobile terminal using a plurality of frequency bands, the mobile terminal comprising:
   a receiving unit for receiving a message including information for measuring a reception quality in the second cell in tune with timing of a predetermined control channel area of a signal transmitted from the first base station in a predetermined frequency band; and
   a measurement unit for measuring the reception quality in the second cell based on the information received, wherein the predetermined control channel area is a control channel area of a subframe on which the first base station performs cross carrier scheduling.

3. The mobile terminal according to claim 2, wherein the information for making a measurement is transmitted from a serving base station to which the mobile terminal belongs.

4. The mobile terminal according to claim 2, wherein the predetermined control channel area is a control channel area of a Multicast Broadcast Single Frequency Network ("MBSFND") subframe by the first base station.

5. The mobile terminal according to claim 2, wherein patterns of the cross carrier scheduling in the first base station and the second base station adjacent to each other are made common to each other.

6. The mobile terminal according to claim 2, wherein patterns of the cross carrier scheduling for mobile terminals connecting to the first base station are made common to each other.

7. The mobile terminal according to claim 2, wherein any mobile terminal belonging to the first base station to which carrier aggregation to enable a wider bandwidth is not applied is not scheduled in the subframe on which the cross carrier scheduling is performed.

8. The mobile terminal according to claim 7, wherein to any mobile terminal that does not apply the cross carrier scheduling and/or the carrier aggregation and that belongs to the first base station, a subframe on which a mobile terminal other than the mobile terminal performing the cross carrier scheduling is not allocated.

9. The mobile terminal according to claim 2, wherein control information on the first cell is included in a data area of a subframe including the predetermined control channel area and transmitted.

10. The mobile terminal according to claim 2, wherein when control information on the first cell is included in a data area of a subframe including the predetermined control channel area and transmitted, a resource amount of the control information is increased.

11. A serving base station to which a mobile terminal belongs in a communication system, where a first cell the range of which is accessible by the mobile terminal is formed by a first base station, a second cell the range of which is accessible by the mobile terminal is formed within the first cell by a second base station, and each of the first base station and the second base station communicates with the mobile terminal using a plurality of frequency bands, the base station to which the mobile terminal belongs comprising:
   a receiving unit for receiving cell information on a cell from an adjacent base station which is adjacent to the serving base station;
   a message generation unit for generating, based on the cell information received, a message including information for causing a reception quality in the second cell to be measured in tune with timing of a predetermined control channel area of a signal to be transmitted in a predetermined frequency band; and
   a transmitting unit for transmitting the generated message to the mobile terminal.

12. A serving base station to which a mobile terminal belongs in a communication system, where a first cell the range of which is accessible by the mobile terminal is formed by a first base station, a second cell the range of which is accessible by the mobile terminal is formed within the first cell by a second base station, and each of the base stations communicates with the mobile terminal using a plurality of frequency bands, the base station comprising:
   a receiving unit for receiving cell information on a cell from an adjacent base station which is adjacent to the serving base station;
   a message generation unit for generating, based on the cell information received, a message including information for causing a reception quality in the second cell to be measured in tune with timing of a predetermined control channel area of a signal to be transmitted in a predetermined frequency band; and
   a transmitting unit for transmitting the generated message to the mobile terminal, wherein the predetermined control channel area is a control channel area of a Multicast Broadcast Single Frequency Network ("MBSFND") subframe by the first base station.

13. The base station according to claim 12, wherein the predetermined control channel area is a control channel area of a subframe on which the first base station performs cross carrier scheduling.

14. The base station according to claim 13, wherein patterns of the cross carrier scheduling in the first base station and the second base station adjacent to each other are made common to each other.

15. The base station according to claim 13, wherein patterns of the cross carrier scheduling for mobile terminals connecting to the first base station are made common to each other.

16. The base station according to claim 13, wherein a mobile terminal belonging to the first base station to which carrier aggregation to enable a wider bandwidth is not applied is not scheduled in the subframe on which the cross carrier scheduling is performed.

17. The base station according to claim 16, wherein to a mobile terminal that does not apply the cross carrier scheduling and/or the carrier aggregation and belongs to the first base station, a subframe on which a mobile terminal other than the mobile terminal is performing the cross carrier scheduling is not allocated.

18. The base station according to claim 12, wherein control information on the first cell is included in a data area of a subframe including the predetermined control channel area and transmitted.

19. The base station according to claim 12, wherein when control information on the first cell is included in a data area of a subframe including the predetermined control channel area and transmitted, a resource amount of the control information is increased.

20. A cell reception quality measuring method for a mobile terminal in a communication system, where a first cell the range of which is accessible by the mobile terminal is formed by a first base station, a second cell the range of which is accessible by the mobile terminal is formed within the first cell by a second base station, and each of the first base station and the second base station communicates with the mobile terminal using a plurality of frequency bands, the method comprising:
   a step of causing a serving base station, to which the mobile terminal belongs, to generate a message including information for causing a reception quality in the second cell to be measured in tune with timing of a predetermined control channel area of a signal to be transmitted in a predetermined frequency band, and transmit the message to the mobile terminal; and
   a step of causing the mobile terminal to receive the message including the information transmitted, and measure the reception quality in the second cell based on the information received.

* * * * *